Jan. 31, 1928.

G. W. SAATHOFF 1,657,550

METHOD AND APPARATUS FOR COOLING ELECTRICAL APPARATUS

Filed April 29, 1922     2 Sheets-Sheet 1

Inventor
George W. Saathoff
By His Attorney
Edmund G. Borden

Jan. 31, 1928.  1,657,550
G. W. SAATHOFF
METHOD AND APPARATUS FOR COOLING ELECTRICAL APPARATUS
Filed April 29, 1922   2 Sheets-Sheet 2
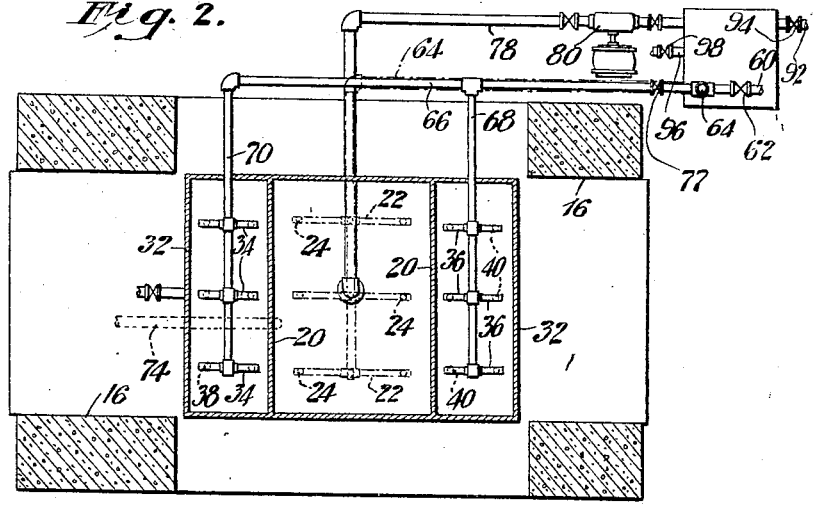
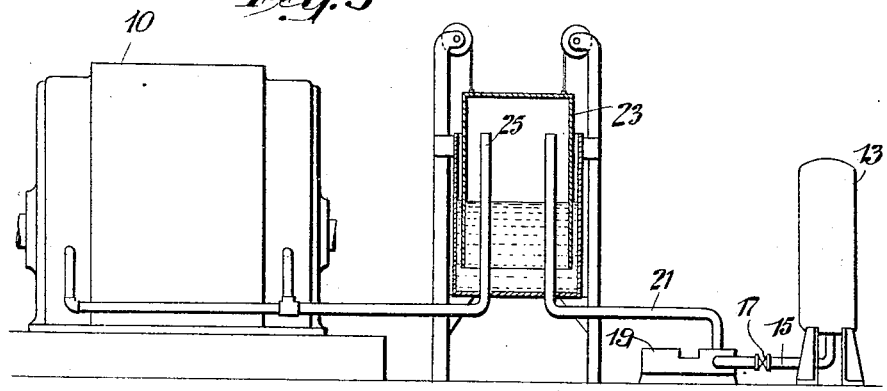
George W. Saathoff  Inventor
By His Attorney
Edmund G. Borden Patented Jan. 31, 1928.

1,657,550

UNITED STATES PATENT OFFICE.

GEORGE W. SAATHOFF, OF SOUTH ORANGE, NEW JERSEY, ASSIGNOR TO DOHERTY RESEARCH COMPANY, OF NEW YORK, N. Y., A CORPORATION OF DELAWARE.

METHOD AND APPARATUS FOR COOLING ELECTRICAL APPARATUS.

Application filed April 29, 1922. Serial No. 557,311.

This invention relates to a method and apparatus for cooling heat-generating electrical apparatus, and more specifically to a method and apparatus for maintaining certain parts of dynamo-electric machinery and other electrical apparatus below predetermined temperatures.

In the operation of high speed turbines and other dynamo-electric machines there is a considerable amount of energy dissipated in the form of heat which is generated through copper losses and stray currents in the various parts of the apparatus and also through hysteresis effects particularly in the armatures or rotors of such electrical apparatus. Without artificial cooling means for the parts of these machines which become heated the temperature of the apparatus would rise to such a point as to weaken or cause a breaking down and burning of the insulation, particularly of the rotor or armature windings of the apparatus. The means ordinarily employed to cool such apparatus is to pass air saturated with water vapor through the casing of the apparatus directly in contact with the heated parts. The water vapor or moisture is employed in the air to increase the heat capacity thereof and thus remove excess heat from the apparatus to be cooled without passing an undue quantity of air therethrough which would result in excessive power loss.

One of the main disadvantages of using air saturated with water vapor for cooling high speed turbines or other electrical apparatus is that in winter the water vapor employed in the air becomes condensed on the walls of the room or rooms where the apparatus is located, and the condensed moisture frequently runs down the walls in small streams and trickles onto the floor, making the air of the room very damp and rendering working conditions particularly disagreeable. It has been suggested in connection with cooling electrical apparatus to employ a closed cycle for air saturated with water vapor, and one apparatus has been built on this principle. This method of cooling however has not worked satisfactorily, and has not therefore been generally adopted. Another disadvantage of the use of air saturated with water vapor is the fact that when a fire is started in the electrical apparatus, the air being circulated therethrough aids in the combustion of the insulation and generally results in a burning out of the armature or rotor windings, thus causing a considerable amount of damage. Such loss due to this cause is so frequent that insurance rates are excessively high on apparatus cooled in this manner.

The primary object of the present invention is to provide a process whereby the danger from fires in dynamo-electric machinery and other electrical apparatus, artificially cooled, may be obviated.

In accordance with this object one feature of the invention constitutes the use of a gas or gases which are non-supporters of combustion.

Another object of the invention is to provide a process of cooling electrical apparatus whereby the disagreeable features accompanying the use of air saturated with water vapor, particularly the feature of the formation of condensation on the walls of the room containing such apparatus, may be eliminated.

In accordance with this object, another feature of the invention is the provision of a closed cycle whereby the gas or gases saturated with water vapor, which are employed as the cooling means, may be circulated through and retained in the apparatus.

A further object of the invention is to provide a process whereby an inert gas which is commonly available may be employed as a cooling means thus rendering the commercial cooling of the electrical apparatus economical and practical.

In accordance with this object another feature of the invention contemplates the use of flue gas, which is a non-supporter of combustion, and, moreover, is available in substantially every power plant in unlimited quantities and may therefore be readily employed for circulation in a closed cycle for the cooling of electrical apparatus.

The apparatus in which the process of the invention may be carried out is described in detail in connection with the accompanying drawings, in which:

Fig. 2 is a horizontal section taken on the line 2—2 of Fig. 1, showing particularly the arrangement of the spraying means.

Fig. 3 is a view in elevation of an apparatus, parts of which are shown in section, in which a modification of the process may be carried out.

Figure 1:
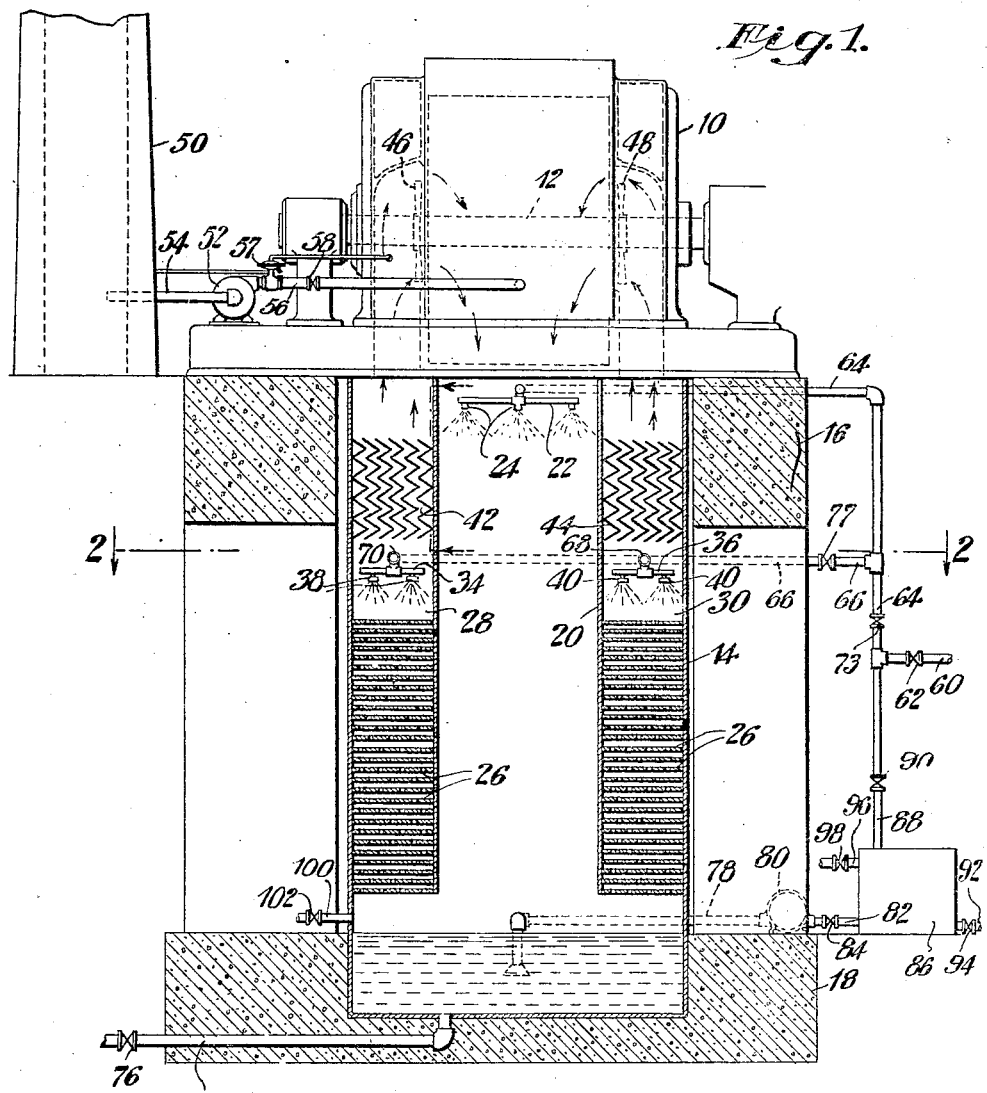
Fig. 1 is a view in elevation and partly in section of an apparatus in which the preferred form of the invention may be carried out.
Figure 4:
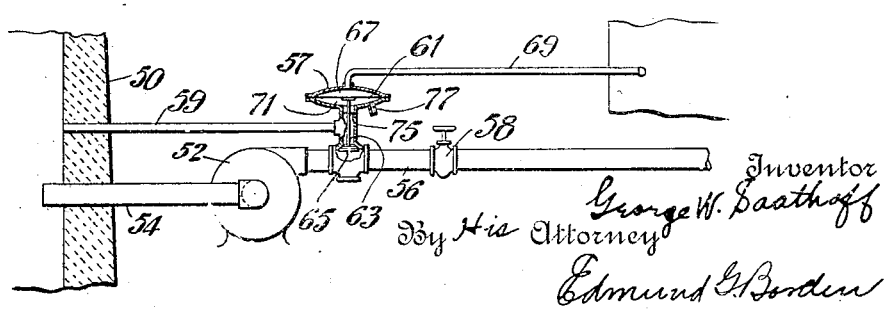
Fig. 4 is a detailed view of the preferred form of relief valve employed in connection with the apparatus of Fig. 1.

In the drawings 10 represents a dynamo-electric machine having a rotating member which is attached to the axle 12, and around which it is desired to circulate a cooling medium. Attached to the casing of the generator 10 is a washer cooler 14, which forms a closed circuit with the casing.

The dynamo-electric machine 10 is supported on foundations as shown in Fig. 1, which foundations are preferably of concrete, and the washer cooler 14 is supported on a similar foundation 18. The cooling medium which is preferably employed in the apparatus, is flue gas, which is passed in a closed circuit from the generator or other electrical apparatus downwardly through an inner casing 20 of the washer cooler. Near the upper end of the washer cooler within the casing 20, water is sprayed from pipes 22 through spray nozzles 24, as shown in Fig. 2 of the drawings. The water spray passes downwardly with the flue gas and has therefore a relatively prolonged contact therewith and substantially saturates the gas with water vapor, and reduces its temperature materially. After passing downwardly through the inner casing 20 of the cooler, the gas receives a reversal in the direction of its passage, which serves to throw out the heavier entrained water particles which fall to the bottom of the washer cooler. The partially cooled gas passes upwardly thereafter through perforated plates 26 which are located in side chambers 28 and 30 formed by the outer walls 32 of the washer cooler and the inner casing 20 as shown particularly in Fig. 2. When passing through the perforated plates 26 the divided streams of gas passing through chambers 28 and 30 are further cooled by means of water introduced by pipes 34 and 36 having spray nozzles 38 and 40 as shown in Fig. 2 of the drawings. The water from the sprays passes down through the apparatus over the perforated plates, which serve to provide intimate contact between the upwardly passing gas and the water passing countercurrent thereto. The gas in its upward passage through the plates 26 becomes thoroughly cooled and saturated with water vapor. The gas streams in chambers 28 and 30 are thereafter passed through zigzag baffles 42 and 44, which remove undesired entrained water particles from the gas. After passing through the baffles 42 and 44, which are preferably of metal, the gas is drawn through the casing of the electrical apparatus or dynamo-electric machinery by means of fans 46 and 48 which force the gas streams into contact with the rotating part of the apparatus and cool the parts which it is desired to maintain at a temperature below certain maximum limits.

In the operation of the apparatus more or less leakage of gas will take place which necessitates supplying either intermittently or continuously an additional quantity of the gas employed to compensate for this loss. In the preferred form of the invention therefore flue gas is drawn from a stack 50 in which a sub-atmospheric pressure is normally present. This gas is forced by means of fan or pump 52 from pipe 54, connected to the stack, through a pipe 56, having valves 57 and 58 therein, into the portion of the casing of the dynamo-electric machinery in which gases are passing from the rotor chamber into the casing of the washer cooler. The pressure in the generator casing in which the gas is circulated is maintained substantially atmospheric, in order to prevent leakage of gas from the apparatus and to prevent passage of atmospheric air into the apparatus. The pump 52 is preferably of centrifugal type, as illustrated, and is operating between a sub-atmospheric pressure in the stack and atmospheric pressure in the closed circuit of the apparatus, and it is particularly desired not to increase the pressure in this circuit substantially above atmospheric pressure. To accomplish this a relief valve 57 is provided in the pipe 56 which will operate to return gas from the outlet side of the pump 52 to the stack 50 through a pipe 59, when the pressure in the casing becomes greater than atmospheric. To control the operation of the valve a diaphragm 61 is connected through the valve stem 63 to a valve 65 which may be displaced downwardly from its seat to permit the passage of gas from the pipe 56 to the pipe 59. An upper chamber 67 in the diaphragm housing is connected through a pipe 69 to the casing 10 at a point where it is desired to maintain atmospheric pressure. A lower chamber 71 in the housing is cut off from communication with the pipe 59 by a diaphragm 75 and communicates through a pipe 77 with the atmosphere. When the pressure in the casing 10 becomes substantially above atmospheric there is a differential pressure set up across the diaphragm 61 which operates the valve and reduces the pressure in the casing. By this means the pressure in the system is maintained substantially uniform.

In coming in contact with water spray in the inner chamber of the washer cooler previously described, the flue gas from the stack is not only cooled and saturated with water vapor, but is also scrubbed thereby. The scrubbing action serves to remove dust or carbon particles in the gas, and is therefore in suitable condition for mingling with the gas previously employed. By bringing the gas directly into contact with a water spray the most effective heat interchange between the water and gas is accomplished and the water absorbs this heat. With this arrangement the water for scrubbing is continuously supplied through a pipe 60 having a valve 62 therein, and is passed from thence into a pipe 64 leading to the spray pipes 22. A pipe 66 has branch pipes 68 and 70 which serve to supply water to the spray pipes 34 and 36. The pipe 66 is provided with a valve 77 and the pipe 64 is provided with a valve 73 by which the flow of water to the spray pipes can be controlled at will. The heated water accumulating in the bottom of the washer cooler may be drawn off through a pipe 74 which is provided with a valve 76.

If the flue gas employed contains acid forming compounds, sulphur compounds, for instance, which will attack the metal of the containers it will be desirable to neutralize against acidity by the addition of a proper reagent such as carbonate of soda, lime or soda lye.

As flue gas is more or less soluble in water and, moreover, as water contains more or less oxygen dissolved therein, which may be liberated when the water becomes finely divided, it is preferable to employ the same cooling water over and over, merely cooling the water by heat interchange through a diaphragm with other water and the last mentioned water may be used as preheated feed water. To accomplish this purpose, the water may be withdrawn from the bottom of the washer cooler through a pipe 78 by means of a pump 80, and be passed from thence through pipe 82, having a valve 84 therein, into a heat interchanger 86 in which the water is cooled to the desired temperature. The water passing from pipe 82 passes through a coil in the heat interchanger, not shown in the drawing, and is withdrawn through pipe 88, having a valve 90 therein. Cooling water or other cooling fluid is supplied to the heat interchanger through pipe 92 having valve 94 therein, and is withdrawn through pipe 96 having valve 98. When water is circulated from the bottom of the washer cooler through the pipes designated to the spraying space in the upper portion of the apparatus, valve 62 in pipe 60 is closed, and thereafter water is supplied to the apparatus only at such periods as is required to compensate for leakage loss in the apparatus. When it is desired to clean the apparatus the water employed for circulation is withdrawn through the bottom of the cooler through the pipe 74, previously described, and fresh water to the desired amount is subsequently admitted through the pipe 60.

In Fig. 3 of the drawings is shown a modification of the apparatus in which a gas other than flue gas may be employed for cooling a turbine or other electrical apparatus. The gases which may be employed for this purpose are helium, argon, nitrogen, hydrogen, carbon dioxide, or mixtures of these gases in any desired proportion. The use of helium is preferable for this purpose to the other gases above enumerated, with the form of apparatus shown in Fig. 3 for the reason that this gas may be obtained in quantity sufficient for commercial purposes and is completely incombustible and is also a non-supporter of combustion. This gas, moreover, would have less resistance in passing through the apparatus than gases of higher molecular weight, and will receive additional capacity by the addition thereto of water in the manner described in connection with Figs. 1 and 2.

By this form of the apparatus 10 represents the electrical apparatus to be cooled to which is attached a washer cooler in the same manner as is shown in Fig. 1. The numeral 13 designates a tank containing the desired gas such as helium, which is passed therefrom through a pipe 15 having a valve 17, through a pump 19, into a pipe 21 leading into a bell 23. The bell 23 may be counterbalanced so that any desired pressure, either atmospheric or sub-atmospheric or super-atmospheric pressure, may be maintained therein in a well-known manner. It is preferred, however, to employ substantially atmospheric pressure in the apparatus for the reasons already set forth. From the bell 23 the gas is passed through a pipe 25 leading from the interior portion of the bell, above the level of water therein, to the generator casing into the path of the gas passing to the generator or electrical apparatus from the washer cooler. The means for cooling and saturating the gas with water vapor and the paths of the gas and water passing through the washer cooler are the same as has been described in connection with Fig. 1.

When it is desired to remove the helium from the apparatus it may be returned to the tank 13 in any desired manner, such for instance, as by forcing air through pipe 100, in which is a valve 102, the pipe being connected to the washer cooler as shown in the drawing in Fig. 1. The air being heavier than helium, it will displace the latter upwardly and will be forced thereby into the bell 23 and from thence into the tank 13. If desired, water could be employed for displacing the helium in the washer cooler in place of air for this purpose.

While the invention has been described in connection with dynamo-electric machinery, it may also be used in connection with all other forms of electrical apparatus, such, for instance, as transformers and other forms of electrical apparatus in which there are no moving elements.

Having thus described the invention, what is claimed as new is:

1. A method of cooling dynamo-electric machinery which comprises withdrawing flue gas from a stream of said gas, passing the said gas into a body of flue gas confined and circulated in a closed circuit including a dynamo-electric machine to be cooled, and washing said gas in a portion of said circuit.

2. In an apparatus of the kind described, means for circulating gas in a closed circuit including a machine to be cooled, said means including an upright passage through which the gas passes toward the machine, means for saturating said gas with water, means following said saturating means in the course of the gas flow for spraying water downwardly through the rising gas, and means in said passage above said spraying means for removing entrained particles of water from the gas stream.

3. In an apparatus of the class described, means for circulating gas in a closed circuit including a machine being cooled, said means including an upright passage through which the gas passes toward the machine to be cooled, a series of perforated plates in the lower portion of said passage, means in said passage above said plates for spraying relatively cold water downwardly through the upwardly passing stream of gas and on to said plates, and means in said passage above said spraying means for removing entrained particles of water from the gas before the gas reaches the machine.

4. In an apparatus of the kind described, means for circulating gas in a closed circuit including a machine to be cooled, means for cooling said gas in said circuit, a fan for introducing gas into said circuit, a by-pass from the delivery to the intake side of said fan and a relief valve controlling said by-pass and operated automatically by the pressure of gas in the cooling circuit.

5. In an apparatus of the class described, a closed circuit containing cooling gas and including a machine to be cooled, means in said circuit for circulating the gas therein, feeding means connected to a sub-atmospheric pressure gas stream for introducing fresh gas into said circuit, and means for maintaining the pressure in said circuit substantially at atmospheric comprising a relief valve connected to said circuit and to said sub-atmospheric stream and operated by the pressure of the gas in said circuit.

6. A method of cooling dynamo-electric machinery which comprises withdrawing flue gas at sub-atmospheric pressure, passing the said gas under increased pressure into a body of flue gas confined and circulated in a closed circuit, passing the combined gases into contact with water spray in a downwardly direction to cool said gases, thereafter passing the gas in an upwardly direction in intimate contact with water, removing excess water from the gas and forcing it into heat interchanging relation with the parts of the apparatus to be cooled, and thereafter recirculating the gas through the cycle, withdrawing the cooling water during the passage of the gases through the cycle, and passing the same into heat interchanging relation with water at a lower temperature, and thereafter spraying the cooled water simultaneously into the paths of the downwardly and upwardly moving gases.

7. A method of maintaining the operating temperature of electrical apparatus below predetermined limits which comprises supplying gas at substantially atmospheric pressure to a closed cycle, cooling the gas by passing the same in a countercurrent direction to water spray and passing the gas into heat transferring relation to the apparatus to be cooled, and thereafter recirculating the gas, and intermittently adding thereto or removing therefrom sufficient gas to maintain the pressure of gas therein substantially constant.

8. In an apparatus of the kind described, a washer cooler, means for connecting the washer cooler with the apparatus to be cooled to form a closed circuit therewith, means for withdrawing gas from one portion of the washer cooler into the apparatus to be cooled and forcing the gas through the said apparatus into a second portion of the said circuit, means for spraying water into the first portion of the said circuit, and means for withdrawing water therefrom, means for spraying water into the second portion of the circuit, means in the said first portion in the path of gas passing to the apparatus to be cooled for removing entrained water from the said gas, means for withdrawing water from the gas-cooling portion of the said circuit and forcing the same through conduits connected to the spraying means to attain circulation of water in a circuit, means in said circuit separate from the gas circuit for cooling the said water, and means connected to the gas circuit for passing gas thereto or withdrawing gas therefrom to maintain in the said gas circuit a pressure substantially atmospheric.

9. In an apparatus of the class described, a casing, means connected with said casing forming a closed circuit therewith containing cooling gas and including a machine to be cooled, means in said circuit for circulating a gas therein, means for cooling the gas in said circuit, feeding means connected to a variable pressure gas supply for introducing fresh gas into said circuit, and means for maintaining the pressure in said circuit substantially at atmospheric.

In testimony whereof I affix my signature.

GEORGE W. SAATHOFF.